(12) United States Patent
Hyung et al.

(10) Patent No.: US 8,428,343 B2
(45) Date of Patent: Apr. 23, 2013

(54) VOXEL MAP GENERATOR AND METHOD THEREOF

(75) Inventors: Seung Yong Hyung, Yongin-si (KR); Kyung Shik Roh, Seongnam-si (KR); Suk June Yoon, Seoul (KR); Sung Hwan Ahn, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 10 days.

(21) Appl. No.: 13/137,832

(22) Filed: Sep. 15, 2011

(65) Prior Publication Data

US 2012/0114174 A1 May 10, 2012

(30) Foreign Application Priority Data

Oct. 11, 2010 (KR) .................. 10-2010-0098927

(51) Int. Cl.
*G06K 9/00* (2006.01)
*G06T 15/00* (2011.01)

(52) U.S. Cl.
USPC .......................................... 382/154; 345/419

(58) Field of Classification Search .................. None
See application file for complete search history.

(56) References Cited

U.S. PATENT DOCUMENTS

| | | | | |
|---|---|---|---|---|
| 5,841,892 A * | 11/1998 | McGrath et al. | ............ | 382/141 |
| 6,556,199 B1 * | 4/2003 | Fang et al. | .................... | 345/424 |
| 6,674,430 B1 * | 1/2004 | Kaufman et al. | ............. | 345/419 |
| 6,775,417 B2 * | 8/2004 | Hong et al. | .................... | 382/253 |
| 6,952,204 B2 * | 10/2005 | Baumberg et al. | ............ | 345/420 |
| 7,039,244 B2 * | 5/2006 | Hong et al. | .................. | 382/232 |
| 7,043,087 B2 * | 5/2006 | Hong et al. | .................. | 382/233 |
| 7,133,041 B2 * | 11/2006 | Kaufman et al. | ............. | 345/419 |
| 7,194,117 B2 * | 3/2007 | Kaufman et al. | ............. | 382/128 |
| 7,446,766 B2 * | 11/2008 | Moravec | ........................ | 345/424 |
| 7,474,776 B2 * | 1/2009 | Kaufman et al. | ............. | 382/128 |
| 7,626,400 B2 * | 12/2009 | Holbrook et al. | ............. | 324/642 |
| 7,801,363 B2 * | 9/2010 | Hong et al. | .................. | 382/232 |
| 7,961,910 B2 * | 6/2011 | Lee et al. | ...................... | 382/103 |
| 8,325,984 B2 * | 12/2012 | Lee et al. | ...................... | 382/103 |

* cited by examiner

*Primary Examiner* — Manav Seth
(74) *Attorney, Agent, or Firm* — Staas & Halsey LLP (57) ABSTRACT

A volume cell (VOXEL) map generation apparatus includes an inertia measurement unit to calculate inertia information by calculating inertia of a volume cell (VOXEL) map generator, a Time of Flight (TOF) camera to capture an image of an object, thereby generating a depth image of the object and a black-and-white image of the object, an estimation unit to calculate position and posture information of the VOXEL map generator by performing an Iterative Closest Point (ICP) algorithm on the basis of the depth image of the object, and to recursively estimate a position and posture of the VOXEL map generator on the basis of VOXEL map generator inertia information calculated by the inertia measurement unit and VOXEL map generator position and posture information calculated by the ICP algorithm, and a grid map construction unit to configure a grid map based on the recursively estimated VOXEL map generator position and posture.

17 Claims, 7 Drawing Sheets

VOXEL MAP GENERATOR AND METHOD THEREOF

CROSS-REFERENCE TO RELATED APPLICATIONS

This application claims the benefit of Korean Patent Application No. 2010-0098927, filed on Oct. 11, 2010 in the Korean Intellectual Property Office, the disclosure of which is incorporated herein by reference.

BACKGROUND

1. Field

Embodiments of the present disclosure relate to a volume cell (VOXEL) map generator for integrating Simultaneous Localization And Mapping (SLAM) into Iterative Closest Point (ICP) and a method for use in the VOXEL map generator.

2. Description of the Related Art

In recent times, many companies are conducting intensive research into 3D scan sensors, each of which generates a disparity map including distance information using a Time of Flight (TOF) camera differently from a conventional camera capable of providing only image information. Such sensors can obtain image brightness information from each pixel, and can also recognize a sensor for each pixel and distance information detected from each pixel. Accordingly, such sensors have been widely utilized in SLAM and obstacle detection. Infrared TOF cameras have numerous applications. For example, a digital device User Interface (UI) based on motion capture, a security system implementation through user recognition based on infrared characteristics, a 3D environment reconstruction serving as a 3D navigation technology, and a matching technology such as ICP have been widely utilized.

Conventionally, the matching technology is carried out through the ICP technology so as to perform localization. In contrast, the ICP technology again performs the ICP operation under the condition that erroneous matching is made on errors, such that there is a high possibility of 3D errors.

SUMMARY

Therefore, it is an aspect of the present disclosure to provide a VOXEL map generator which implements a VOXEL map for writing information about the presence or absence of an object in a virtual grid space, and obviates an error encountered when an ICP algorithm generates a VOXEL map through an inertia measurement apparatus and video-based SLAM.

Additional aspects of the disclosure will be set forth in part in the description which follows and, in part, will be apparent from the description, or may be learned by practice of the disclosure.

In accordance with one aspect of the present disclosure, a volume cell (VOXEL) map generation apparatus includes an inertia measurement unit to calculate inertia information by calculating inertia of a volume cell (VOXEL) map generator, a Time of Flight (TOF) camera to capture an image of an object, thereby generating a depth image of the object and a black-and-white image of the object, an estimation unit to calculate position and posture information of the VOXEL map generator by performing an Iterative Closest Point (ICP) algorithm on the basis of the depth image of the object, and to recursively estimate a position and posture of the VOXEL map generator on the basis of not only VOXEL map generator inertia information calculated by the inertia measurement unit but also VOXEL map generator position and posture information calculated by the ICP algorithm, and a grid map construction unit to configure a grid map on the basis of the recursively estimated VOXEL map generator position and posture and information about the object measured by the TOF camera.

The estimation unit performs simultaneous localization and mapping (SLAM) based on the black-and-white image captured by the TOF camera, such a position and posture of the VOXEL map generator are estimated.

The estimation unit converts a matrix related to the VOXEL map generator position and posture information calculated by performing simultaneous localization and mapping (SLAM) based on the black-and-white image of the object into an error covariance format, such that a position and posture of the VOXEL map generator are estimated.

The estimation unit converts the matrix related to the VOXEL map generator position and posture information calculated by performing an iterative closest point (ICP) algorithm on a depth image of the object into an error covariance format, such that a position and posture of the VOXEL map generator are estimated.

The error covariance of the matrix related to the VOXEL map generator position and posture information calculated by execution of the simultaneous localization and mapping (SLAM) based on video is calculated on the basis of state variables of the object position and posture information matrix calculated by execution of simultaneous localization and mapping (SLAM) based on the black-and-white image of the object.

The error covariance of the matrix related to the VOXEL map generator position and posture information calculated by execution of simultaneous localization and mapping (SLAM) based on video is calculated on the basis of state variables of the object position and posture information matrix calculated by execution of simultaneous localization and mapping (SLAM) based on the black-and-white image of the object.

The estimation unit calculates an error covariance of the matrix related to the VOXEL map generator position and posture information calculated by execution of simultaneous localization and mapping (SLAM) based on video, calculates the Jacobian of the VOXEL map generator position and posture information matrix calculated by execution of the ICP algorithm, and estimates a position and posture of the VOXEL map generator in response to a gain calculated through the error covariance that modifies a state variable on the basis of the Jacobian result.

In accordance with another aspect of the present disclosure, a method for generating a volume cell (VOXEL) includes calculating inertia information by measuring inertia of a VOXEL map generator, capturing an image of an object through a Time of Flight (TOF) camera, thereby generating a depth image of the object, calculating position and posture information of the VOXEL map generator by performing an Iterative Closest Point (ICP) algorithm on the depth image of the object, repeatedly estimating a position and posture of the VOXEL map generator according to a measurement angle on the basis of not only the calculated VOXEL map generator inertia information but also the VOXEL map generator position and posture information calculated by execution of the Iterative Closest Point (ICP) algorithm, and constructing a grid map on the basis of the repeatedly estimated VOXEL map generator position and posture information.

In accordance with another aspect of the present disclosure, a method for reducing errors of a position and posture of a volume cell (VOXEL) map generator includes capturing an image of an object through a Time of Flight (TOF) camera, and generating a depth image of the object, calculating position and posture information of a VOXEL map generator by performing an Iterative Closest Point (ICP) algorithm on a depth image of the object, and estimating a position and posture of the VOXEL map generator, and converting a matrix related to the calculated VOXEL map generator position and posture information into an error covariance format, thereby reducing errors of the estimated VOXEL map generator position and posture.

In accordance with another aspect of the present disclosure, a method for reducing errors of a position and posture of a volume cell (VOXEL) map generator includes calculating inertia information by measuring inertia of a VOXEL map generator, capturing an image of an object through a Time of Flight (TOF) camera, thereby generating a depth image of the object, calculating position and posture information of the VOXEL map generator on the basis of not only the calculated VOXEL map generator inertia information but also VOXEL map generator position and posture information calculated by an iterative closest point (ICP) algorithm, and converting a matrix of the calculated VOXEL map generator inertia information and a matrix of the VOXEL map generator position and posture information calculated using the ICP algorithm into an error covariance format, thereby reducing errors of the estimated VOXEL map generator position and posture.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout.

The 3D occupancy gridmap divides a space into several areas using a predetermined grid, and engraves the probability indicating whether a corresponding space is filled or empty in the corresponding space, such that it can obtain information about the space. A unit grid is referred to as a volume cell (VOXEL), and a gridmap formed by such grid is a VOXEL map.

The embodiments of the present disclosure will hereinafter be described with reference to the accompanying drawings.

Figure 1:
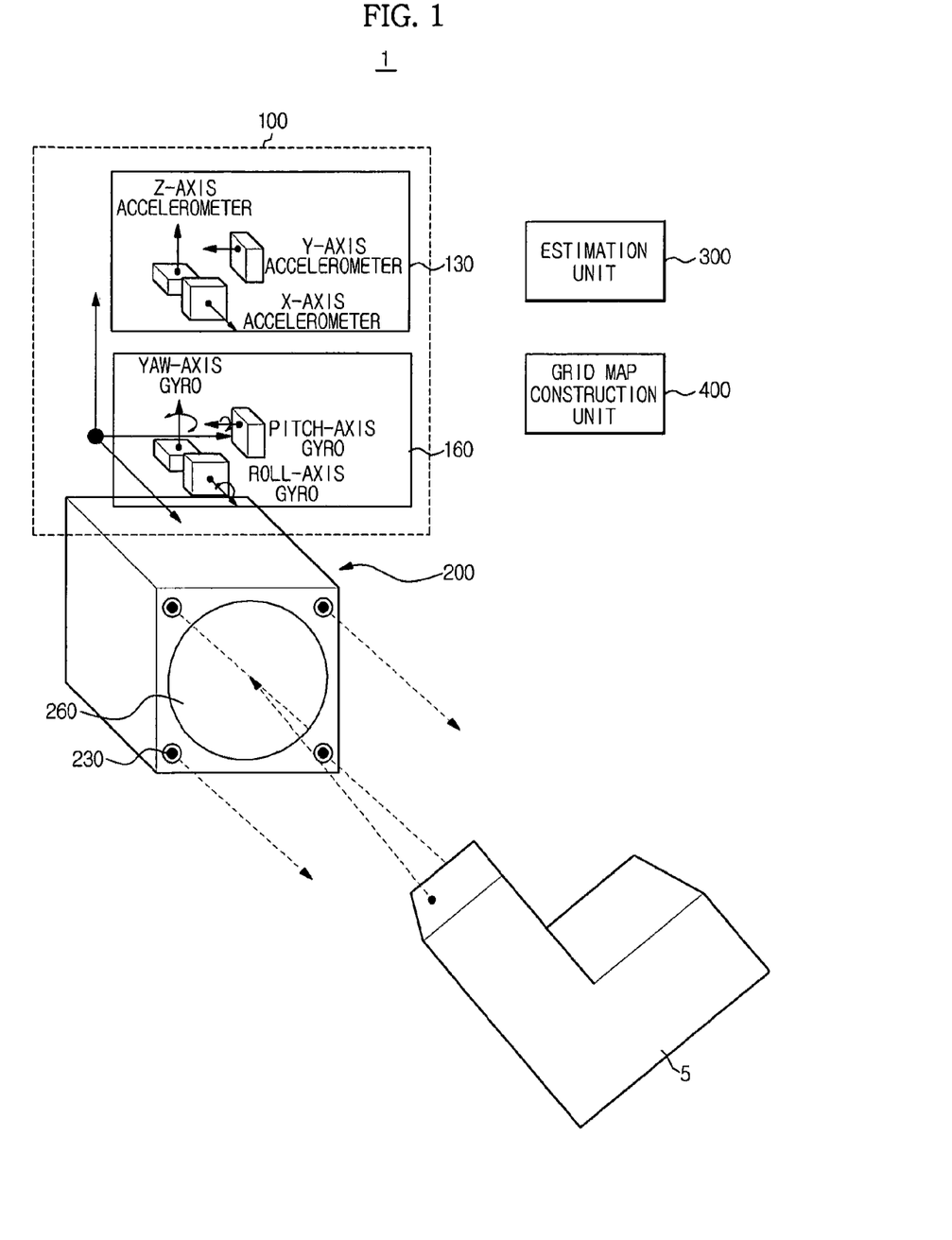
FIG. 1 is a perspective view illustrating a VOXEL map generator according to an exemplary embodiment of the present disclosure.

FIG. 1 is a perspective view illustrating a VOXEL map generator according to an exemplary embodiment of the present disclosure.

Referring to FIG. 1, the VOXEL map generator 1 includes an inertia measurement apparatus 100, a TOF camera 200, an estimator 300, and a grid map generator 400.

The inertia measurement apparatus 100 includes an acceleration sensor 130 and a gyro sensor 160. The number of acceleration sensors is 3 and the number of gyro sensors is 3 such that the inertia measurement apparatus 100 can obtain acceleration and angular velocity information with 6 DOF (Degrees of Freedom).

The acceleration sensor 130 measures acceleration of the target object 5, and includes an X-axis accelerometer, a Y-axis accelerometer, and a Z-axis accelerometer.

The TOF camera 200 includes a light emitting part 230 and a light receiving part 260. If the light emitting part 230 outputs infrared rays varying sinusoidally, an image cell of the light receiving part 260 receives light reflected from the target object 5, such that it calculates the moving distance of the light. On the basis of the calculated light moving distance, the TOF camera 200 collects several thousand image cells or tens of thousands of image cells, and accumulates the collected image cells, such that it makes one-depth image.

The estimation unit (300) performs the ICP algorithm on the basis of the depth image of the object so as to calculate position- and posture-information of the object, and estimates the position and posture of the object several times according to a measurement angle on the basis of not only the object inertia information calculated by the inertia measurement apparatus 100, but also the object position- and posture-information calculated by the ICP algorithm.

The grid map constructing unit configures a grid map on the basis of the object position and posture information estimated several times. This grid map means a VOXEL map.

In this case, the ICP algorithm performs 1:1 matching about the closest points, searches for a conversion point where the sum of the distance values reaches a minimum value, and repeats the corresponding process under the conversion state. In addition, the ICP algorithm searches for the most probable position between conversion results, such that it can minimize 3D salt and pepper noise. However, the accumulated error is very large, such that a distorted image may be the end result.

Figure 2:
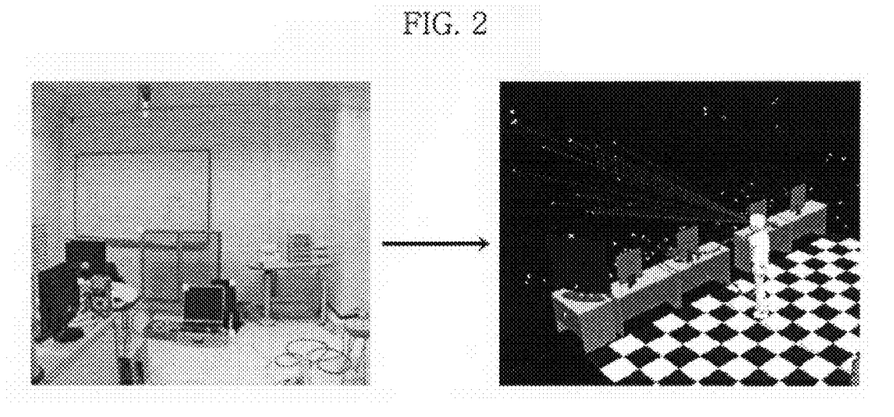
FIG. 2 shows a method for implementing a video-based'SLAM technology for use in a VOXEL map generation method according to another embodiment of the present disclosure.

FIG. 2 shows a method for implementing a video-based SLAM technology for use in a VOXEL map generation method according to another embodiment of the present disclosure.

The left image of FIG. 2 is captured by a TOF camera, and the right image of FIG. 2 shows video-based SLAM using the captured image.

SLAM is an algorithm for simultaneous localization and mapping that monitors a peripheral area while moving in an arbitrary space so that it can estimate the map and current position of the corresponding space. In other words, the SLAM maps environmental data to recognizable information, and performs localization on the basis of the mapped result. In addition, real-time image-based SLAM can obtain a current position from a camera at any platforms that desire to recognize the current position. A characteristic point map composed of natural landmarks scattered throughout the entire space is generated by the movement of camera, and at the same time the 3D localization of the camera is achieved. In the case of the image-based SLAM, because of information acquisition synchronization of the sensor and the TOF camera or problems associated with number of characteristic points, a fine position error occurs. Although the position error unavoidably leaves an unclean track to a VOXEL map, the continuously accumulated error is very small.

In addition, the TOF camera has a limited viewing angle. In the case of using the inertia measurement apparatus 100, the accuracy of the image-based SLAM posture estimation process is increased, and the reliability of image characteristic point tracking process is also increased.

Image-based SLAM is performed using an extended Kalman filter, and the SLAM result is divided into an estimation process and an update process. Through the update process, information about the inertia measurement apparatus 100 and the image characteristic point position may be applied to the Kalman filter. In the case of performing the SLAM by adding inertia information measured by the inertia measurement apparatus 100 instead of using only the image, the size of an area, that must be found in the image during the detection process for searching for a characteristic point, can be greatly reduced, the reliability of the result is increased and the number of calculations can be reduced.

In addition, the estimation unit (300) performs image-based SLAM on the basis of the object's depth image, so that it estimates the position and posture of the object. In order to more accurately estimate the position and posture of the object, an error covariance of the image-based SLAM result is calculated to estimate the position and posture of the object. First, in order to recognize the position of the VOXEL map generator 1, the amplitude image generated by the TOF camera 200 is utilized. The amplitude image is data obtained by measuring brightness data, instead of distance data generated by the TOF camera 200. If the amplitude image is obtained as a by-product of the distance data, this amplitude image has the same format as that of a general CCD camera. Next, image-based SLAM is used to form an environment map composed of characteristic points different from those of the VOXEL map, and at the same time recognizes the position of the object 5. The image-based SLAM has the following state variables shown in the following Expression.

$$\hat{x} = \begin{bmatrix} V \\ \hat{y}_1 \\ \hat{y}_2 \\ \vdots \end{bmatrix}, P = \begin{bmatrix} P_{VV} & P_{Vy1} & P_{Vy2} & \ldots \\ P_{y1V} & P_{Vy1} & P_{Vy2} & \ldots \\ P_{y2V} & P_{Vy1} & P_{Vy2} & \ldots \\ \vdots & \vdots & \vdots & \ldots \end{bmatrix} \quad [\text{Expression}]$$

In the image-based SLAM, there are two state variables. A posture state variable representing the position of a sensor system (including the inertia measurement apparatus and the TOF camera) is represented by the following Equation 1.

$$V_k = \begin{bmatrix} q_k \\ x_k \end{bmatrix} = [q_0 \ q_1 \ q_2 \ q_3 \ x \ y \ z]^T \quad [\text{Equation 1}]$$

The image-based SLAM searches for a video-based invariable characteristic point, and calculates the position of the target object 5 and the error covariance. In this case, the calculated image-based SLAM covariance ($\Lambda_{slam}$) is obtained by extracting a first 'Pvv' value of the matrix P.

However, when measurement information of the TOF camera 200 and execution information of the image-based SLAM are obtained in the VOXEL map generation process, synchronization may not occur due to a time difference. In order to solve this problem, the ICP algorithm may be used. In more detail, when the ICP error covariance ($\Lambda_{icp}$) is obtained such that the measurement information of the TOF camera 200 and the image-based SLAM execution information are obtained, the ICP error covariance ($\Lambda_{icp}$) can solve the problem of synchronization failure caused by a time difference.

The estimation unit (300) calculates the position and posture information of the object by performing the ICP algorithm on the basis of the depth image of the object, such that it can compensate for a vibration error encountered when only the image-based SLAM is performed. According to the ICP framework, a rotation conversion and a translation conversion, that make a minimum sum value of the distances between points ($p_1$ and $p_2$) each having an orthogonal vector 'n', can be calculated by the following Equation 2.

$$E = \Sigma [(Rp_{1i} + t - p_{2i}) \cdot n_i]^2 \quad [\text{Equation 2}]$$

In Equation 2, 'R' is a rotation conversion matrix, and 't' is a translation conversion vector. Although the rotation conversion matrix is not identical to the linear conversion, the rotation conversion based on the ICP algorithm is related to a very small angle such that it can be converted as shown in the following Equation 3.

$$R = \begin{bmatrix} 1 & -d\gamma & d\beta \\ d\gamma & 1 & -d\alpha \\ -d\beta & d\alpha & 1 \end{bmatrix} \quad [\text{Equation 3}]$$

If Equation 3 is substituted into Equation 2, the following Equation 4 can be obtained.

$$E = \Sigma_i [(p_{1i} - p_{2i}) \cdot n_i + t \cdot n_i + r \cdot q_i]^2 \quad [\text{Equation 4}]$$

In Equation 4, $q = p_1 \times n$ and $r = [d\alpha \ d\beta \ d\gamma]^T$ are defined.

In order to obtain a minimum E value, if each of $d\alpha$, $d\beta$, $d\gamma$, dx, dy, dz is partially differentiated, each of the resultant values must be an extreme value, and each of the resultant values is zero. Therefore, the linear equation shown in Equation 5 can be obtained.

$$\sum_i \begin{bmatrix} q_{i1}q_{i1} & q_{i1}q_{i2} & q_{i1}q_{i3} & q_{i1}\eta_{i1} & q_{i1}\eta_{i2} & q_{i1}\eta_{i3} \\ q_{i2}q_{i1} & q_{i2}q_{i2} & q_{i2}q_{i3} & q_{i2}\eta_{i1} & q_{i2}\eta_{i2} & q_{i2}\eta_{i3} \\ q_{i3}q_{i1} & q_{i3}q_{i2} & q_{i3}q_{i3} & q_{i3}\eta_{i1} & q_{i3}\eta_{i2} & q_{i3}\eta_{i3} \\ \eta_{i1}q_{i1} & \eta_{i1}q_{i2} & \eta_{i1}q_{i3} & \eta_{i1}\eta_{i1} & \eta_{i1}\eta_{i2} & \eta_{i1}\eta_{i3} \\ \eta_{i2}q_{i1} & \eta_{i2}q_{i2} & \eta_{i2}q_{i3} & \eta_{i2}\eta_{i1} & \eta_{i2}\eta_{i2} & \eta_{i2}\eta_{i3} \\ \eta_{i3}q_{i1} & \eta_{i3}q_{i2} & \eta_{i3}q_{i3} & \eta_{i3}\eta_{i1} & \eta_{i3}\eta_{i2} & \eta_{i3}\eta_{i3} \end{bmatrix} \begin{bmatrix} d\alpha \\ d\beta \\ d\gamma \\ dx \\ dy \\ dz \end{bmatrix} = -\sum_i \begin{bmatrix} q_{i1}(p_{i1} - p_{i2}) \cdot n_i \\ q_{i2}(p_{i1} - p_{i2}) \cdot n_i \\ q_{i3}(p_{i1} - p_{i2}) \cdot n_i \\ \eta_{i1}(p_{i1} - p_{i2}) \cdot n_i \\ \eta_{i2}(p_{i1} - p_{i2}) \cdot n_i \\ \eta_{i3}(p_{i1} - p_{i2}) \cdot n_i \end{bmatrix} \quad [\text{Equation 5}]$$

Equation 5 may have $\Lambda_{icp} v_{icp} = b$. In Equation 5, a (6×6) matrix I defined as an uncertain ICP matrix, and a (6×1) matrix is an ICP error covariance ($\Lambda_{icp}$), such that state variables of the object's position and posture information matrix calculated by the ICP algorithm are defined. The ICP error covariance ($\Lambda_{icp}$) may be defined as an ellipsoid of the 6 DOF space, such that the resultant ellipsoidal equation may be represented by the following Equation 6.

$$v^T \Lambda_{icp} v = 1 \quad [\text{Equation 6}]$$

The object's position and posture information matrix calculated by the ICP algorithm may be defined in a coordinate system composed of dα, dβ, dγ, dx, dy, dz. The ellipsoid is defined as an uncertainty hyper ellipsoid. A principal axis of each ellipsoid is comprised of an Eigen vector of the ICP error covariance ($\Lambda_{icp}$). The length of each principal axis indicates the degree of localization and uncertainty decided by the ICP algorithm. Preferably, according to the ICP-based localization result, each axis of the uncertainty hyper ellipsoid may have a short length. That is, it is necessary to minimize the Eigen value of the ICP error covariance ($\Lambda_{icp}$).

In order to allow the estimation unit (300) to estimate the position and posture of the target object 5 through the image-based SLAM and ICP algorithm, it is necessary to calculate an optimum estimation value using the optimum gain ($K_1$) based on the image-based SLAM and ICP algorithm, as denoted by the following Equation 7.

$$\hat{v} = K_1 v_{icp} \quad \text{[Equation 7]}$$

In Equation 7, the optimum gain $K_1$ may be calculated through the ICP error covariance ($\Lambda_{icp}$) and the SLAM error covariance ($\Lambda_{slam}$). First, state variables $\Lambda_{icp}$ and $\Lambda_{slam}$ are different from each other, such that Jacobian of the $\Lambda_{slam}$ value is calculated and the state variables are modified according to the $\Lambda_{icp}$ value. The Jacobian may be defined as shown in Equation 8.

$$J = \partial v / \partial V \quad \text{[Equation 8]}$$

In Equation 8, an optimum gain $K_1$ is decided by the following Equation 9.

$$K_1 = J\Lambda_{slam} J^T (J\Lambda_{slam} J^T + \Lambda_{icp})^{-1} \quad \text{[Equation 9]}$$

The VOXEL map generator 1 according to an exemplary embodiment of the present disclosure can more accurately estimate the position and posture of the target object 5 on the basis of the optimum gain $K_1$. Equation 10 indicates a newly generated VOXEL map according to one embodiment of the present disclosure.

$$V_{new} = q_{slam} \otimes_q (\hat{v}) \quad \text{[Equation 10]}$$

The newly obtained VOXEL map generates a small amount of noise caused by distortion, and does not diverge from an actual state.

Figure 3:
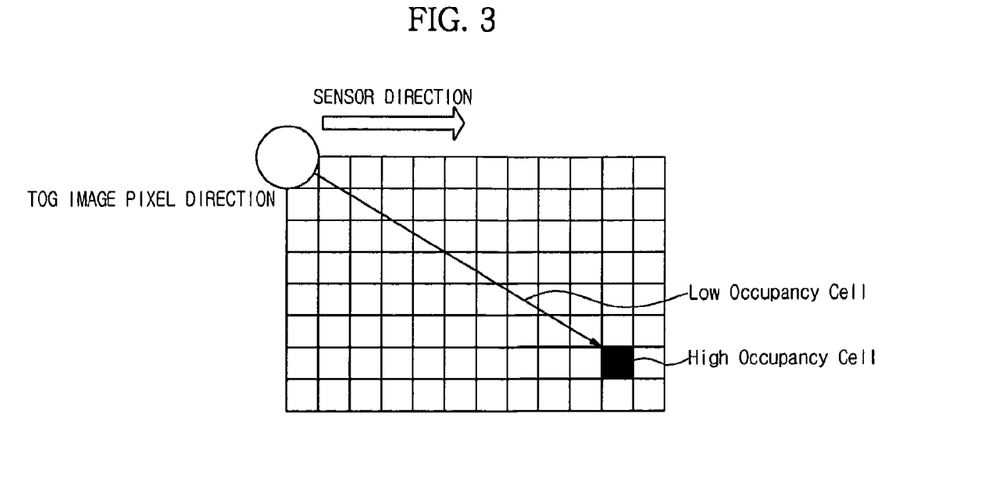
FIG. 3 is a conceptual diagram illustrating a method for generating a VOXEL map according to another embodiment of the present disclosure.

FIG. 3 is a conceptual diagram illustrating a method for generating a VOXEL map according to another embodiment of the present disclosure. FIG. 3 shows the result of a VOXEL map filled with the occupancy probabilities.

Figure 4:
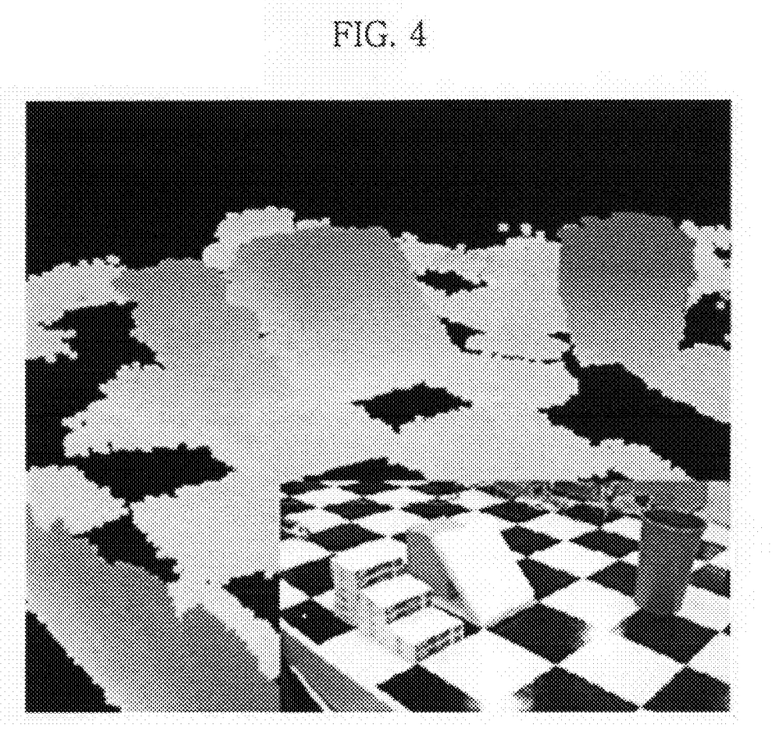
FIGS. 4 and 5 show a VOXEL map obtained through other embodiments of the present disclosure.
Figure 5:
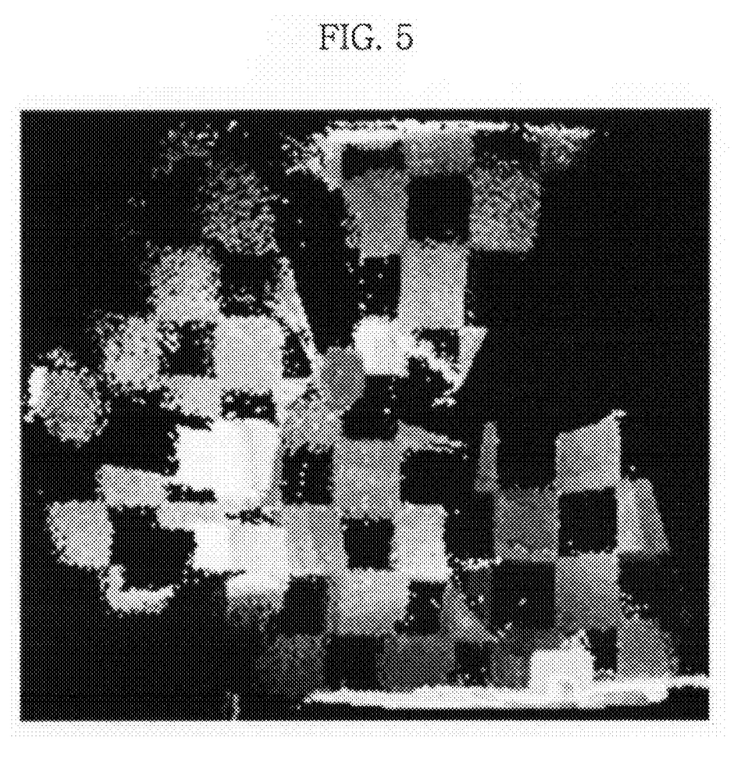

FIGS. 4 and 5 show a VOXEL map obtained through other embodiments of the present disclosure. In FIGS. 4 and 5, stairs, an inclined plane, and cylindrical objects (e.g., a cylindrical trash can) are shown in real time in the VOXEL map. This VOXEL map has a small amount of noise and no divergence. As can be seen from FIGS. 4 and 5, a horizontal plane of each stair and an angle of the incline plane may be relatively and clearly shown, and a circular surface of the cylinder is very close to an actual shape thereof.

Figure 6:
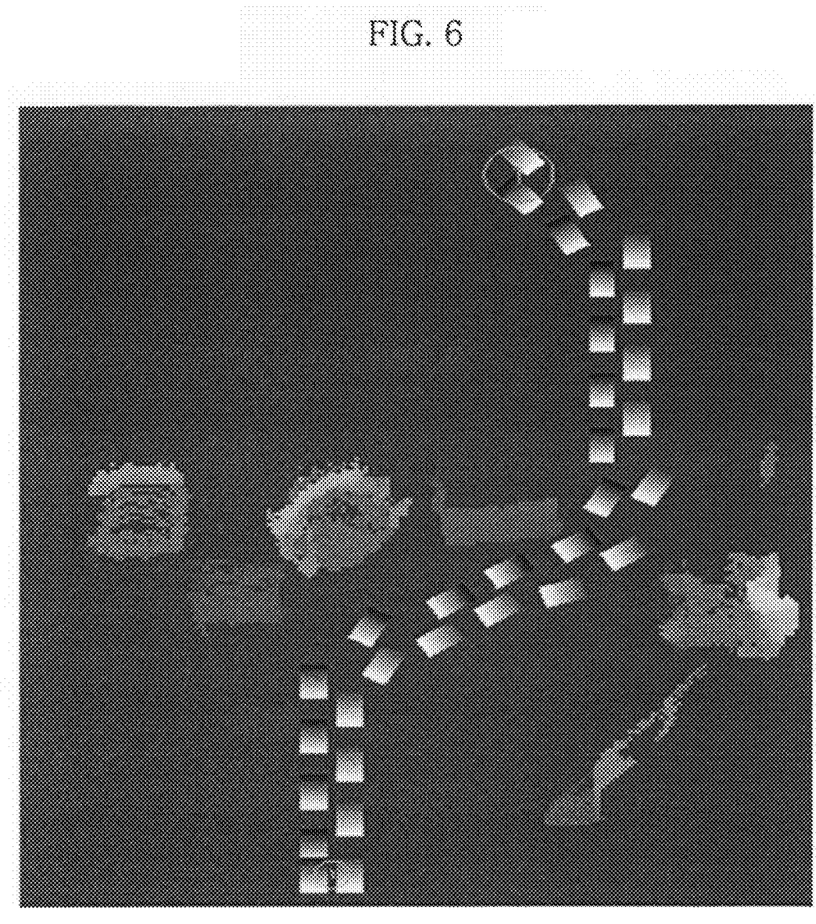
FIG. 6 shows a humanoid footstep navigation based on a VOXEL map obtained through other embodiments of the present disclosure.

FIG. 6 shows a humanoid footstep navigation based on a VOXEL map obtained through other embodiments of the present disclosure.

In FIG. 6, a footstep planner for generating a humanoid's walking track is considered to be a representative application method that can be obtained through a VOXEL map. The VOXEL map of FIG. 5 shows the positions of obstacles, and the footstep planner generates an evasive path.

Figure 7:
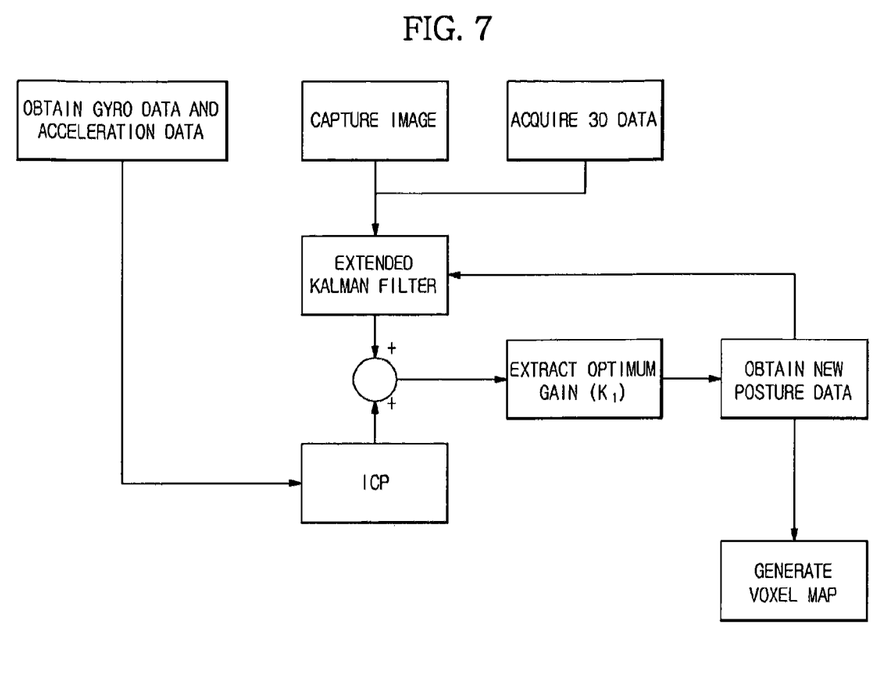
FIG. 7 is a block diagram illustrating a method for generating a VOXEL map according to another embodiment of the present disclosure.

FIG. 7 is a block diagram illustrating a method for generating a VOXEL map according to another embodiment of the present disclosure.

Referring to FIG. 7, the VOXEL map generator obtains acceleration data and gyro data through the acceleration sensor 130 and the gyro sensor 160 contained in the inertia measurement apparatus 100. The obtained acceleration data and gyro data are indicative of inertia information of the target object 5, and changes inertia information into the position and posture information of the object using the ICP algorithm. The image (i.e., a depth image) obtained through the TOF camera 200 or 3D data is obtained. Subsequently, the obtained image or 3D data is processed according to the image-based SLAM algorithm using the extended Kalman filter. The information calculated by the image-based SLAM is combined with the inertia information calculated by the ICP algorithm, such that the position and posture information of the target object 5 are estimated. In this case, individual covariances of the image-based SLAM process and the ICP algorithm are obtained, such that an optimum gain $K_1$ calculated between individual covariance values is extracted. The new position and posture data are obtained through the extracted optimum gain $K_1$, are then applied to the extended Kalman filter, such that more accurate position and posture are estimated to form the VOXEL map, or the VOXEL map may be directly generated without any process.

The method for reducing errors of the position and posture of the VOXEL map generator according to still another embodiment of the present disclosure captures the object using the TOF camera 200 to generate a depth image of the object, performs the ICP algorithm on the basis of the depth image of the object, calculates the position and posture information of the VOXEL map generator, and converts a matrix indicating the position and posture information of the VOXEL map generator into an error covariance, such that it can reduce the errors of the position and posture of the VOXEL map generator.

A method for reducing errors of the position and posture of the VOXEL map generator according to yet another embodiment of the present disclosure measures inertia of the VOXEL map generator to calculate inertia information, captures the object through the TOF camera 200 to generate a depth image of the object, estimates the position and posture information of the object on the basis of calculated inertia information and the VOXEL map generator position and posture information calculated using the ICP algorithm, and converts a matrix indicating the calculated VOXEL map generator inertia information and a matrix indicating the ICP-processed VOXEL map generator position and posture information into an error covariance, such that it can reduce the estimated position and posture errors of the VOXEL map generator.

As is apparent from the above description, the VOXEL map generator and a method for use in the same according to the embodiments of the present disclosure can minimize errors encountered when an algorithm is executed by both the ICP inertia measurement apparatus for generating a VOXEL map and a video-based SLAM technology.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A volume cell (VOXEL) map generation apparatus comprising:
   an inertia measurement unit to calculate inertia information by calculating inertia of a volume cell (VOXEL) map generator;
   a Time of Flight (TOF) camera to capture an image of an object, thereby generating a depth image of the object and a black-and-white image of the object;

an estimation unit to calculate position and posture information of the VOXEL map generator by executing an Iterative Closest Point (ICP) algorithm on the basis of the depth image of the object, and to recursively estimate a position and posture of the VOXEL map generator on the basis of not only VOXEL map generator inertia information calculated by the inertia measurement unit but also VOXEL map generator position and posture information calculated by the ICP algorithm; and a grid map construction unit to configure a grid map on the basis of the recursively estimated VOXEL map generator position and posture and information about the object measured by the TOF camera.

2. The apparatus according to claim 1, wherein the estimation unit performs simultaneous localization and mapping (SLAM) based on the black-and-white image captured by the TOF camera, such that it estimates a position and posture of the VOXEL map generator.

3. The apparatus according to claim 2, wherein the estimation unit converts a matrix related to the VOXEL map generator position and posture information calculated by performing the simultaneous localization and mapping (SLAM) based on the black-and-white image of the object into an error covariance format, such that it estimates a position and posture of the VOXEL map generator.

4. The apparatus according to claim 3, wherein the estimation unit converts the matrix related to the VOXEL map generator position and posture information calculated by performing an iterative closest point (ICP) algorithm on a depth image of the object into an error covariance format, such that a position and posture of the VOXEL map generator are estimated.

5. The apparatus according to claim 4, wherein the error covariance of the matrix related to the VOXEL map generator position and posture information calculated by execution of the simultaneous localization and mapping (SLAM) based on video is calculated on the basis of state variables of the object position and posture information matrix calculated by execution of simultaneous localization and mapping (SLAM) based on the black-and-white image of the object.

6. The apparatus according to claim 5, wherein the error covariance of the matrix related to the VOXEL map generator position and posture information calculated by execution of the ICP algorithm is calculated on the basis of state variables of the VOXEL map generator position and posture information calculated by execution of the ICP algorithm based on the depth image of the object.

7. The apparatus according to claim 6, wherein the estimation unit calculates an error covariance of the matrix related to the VOXEL map generator position and posture information calculated by execution of the simultaneous localization and mapping (SLAM) based on video, calculates Jacobian of the VOXEL map generator position and posture information matrix calculated by execution of the ICP algorithm, and estimates a position and posture of the VOXEL map generator in response to a gain calculated through the error covariance that modifies a state variable on the basis of the Jacobian result.

8. The apparatus according to claim 1, wherein the inertia measurement apparatus includes a gyro sensor or an acceleration sensor.

9. A method for generating a volume cell (VOXEL) comprising:
calculating inertia information by measuring inertia of a VOXEL map generator;
capturing an image of an object through a Time of Flight (TOF) camera, thereby generating a depth image of the object;
calculating position and posture information of the VOXEL map generator by performing an Iterative Closest Point (ICP) algorithm on the depth image of the object;
repeatedly estimating a position and posture of the VOXEL map generator according to a measurement angle on the basis of the calculated VOXEL map generator inertia information and the VOXEL map generator position and posture information calculated by execution of the Iterative Closest Point (ICP) algorithm; and
constructing a grid map on the basis of the repeatedly estimated VOXEL map generator position and posture information.

10. The method according to claim 9, further comprising performing simultaneous localization and mapping (SLAM) based on a black-and-white image captured by the TOF camera.

11. The method according to claim 10, further comprising converting a matrix related to the VOXEL map generator position and posture information calculated by performing the simultaneous localization and mapping (SLAM) based on the black-and-white image of the object into an error covariance format.

12. The method according to claim 11, further comprising converting the matrix related to the VOXEL map generator position and posture information calculated by performing an iterative closest point (ICP) algorithm on a depth image of the object into an error covariance format.

13. The method according to claim 12, wherein the error covariance of the matrix related to the VOXEL map generator position and posture information calculated by execution of the simultaneous localization and mapping (SLAM) based on video is calculated on the basis of state variables of the object position and posture information matrix calculated by execution of simultaneous localization and mapping (SLAM) based on the black-and-white image of the object.

14. The method according to claim 13, wherein the error covariance of the matrix related to the VOXEL map generator position and posture information calculated by execution of the ICP algorithm is calculated on the basis of state variables of the VOXEL map generator position and posture information calculated by execution of the ICP algorithm based on the depth image of the object.

15. The method according to claim 14, further comprising:
calculating an error covariance of the matrix related to the VOXEL map generator position and posture information calculated by execution of the simultaneous localization and mapping (SLAM) based on video;
calculating Jacobian of the VOXEL map generator position and posture information matrix calculated by execution of the ICP algorithm; and
estimating a position and posture of the VOXEL map generator in response to a gain calculated through the error covariance that modifies a state variable on the basis of the Jacobian result.

16. A method for reducing errors of a position and posture of a volume cell (VOXEL) map generator, the method comprising:
capturing an image of an object through a Time of Flight (TOF) camera, and generating a depth image of the object;
calculating position and posture information of a VOXEL map generator by performing an Iterative Closest Point (ICP) algorithm on a depth image of the object, and estimating a position and posture of the VOXEL map generator; and converting a matrix related to the calculated VOXEL map generator position and posture information into an error covariance format, thereby reducing errors of the estimated VOXEL map generator position and posture.

17. A method for reducing errors of a position and posture of a volume cell (VOXEL) map generator, the method comprising:

calculating inertia information by measuring inertia of a VOXEL map generator;

capturing an image of an object through a Time of Flight (TOF) camera, thereby generating a depth image of the object;

calculating position and posture information of the VOXEL map generator on the basis of not only the calculated VOXEL map generator inertia information but also VOXEL map generator position and posture information calculated by an iterative closest point (ICP) algorithm; and converting a matrix of the calculated VOXEL map generator inertia information and a matrix of the VOXEL map generator position and posture information calculated by execution of the ICP algorithm into an error covariance format, thereby reducing errors of the estimated VOXEL map generator position and posture.

* * * * *